Aug. 27, 1940.    F. M. HARM    2,212,600
CHECK VALVE
Filed Dec. 31, 1938
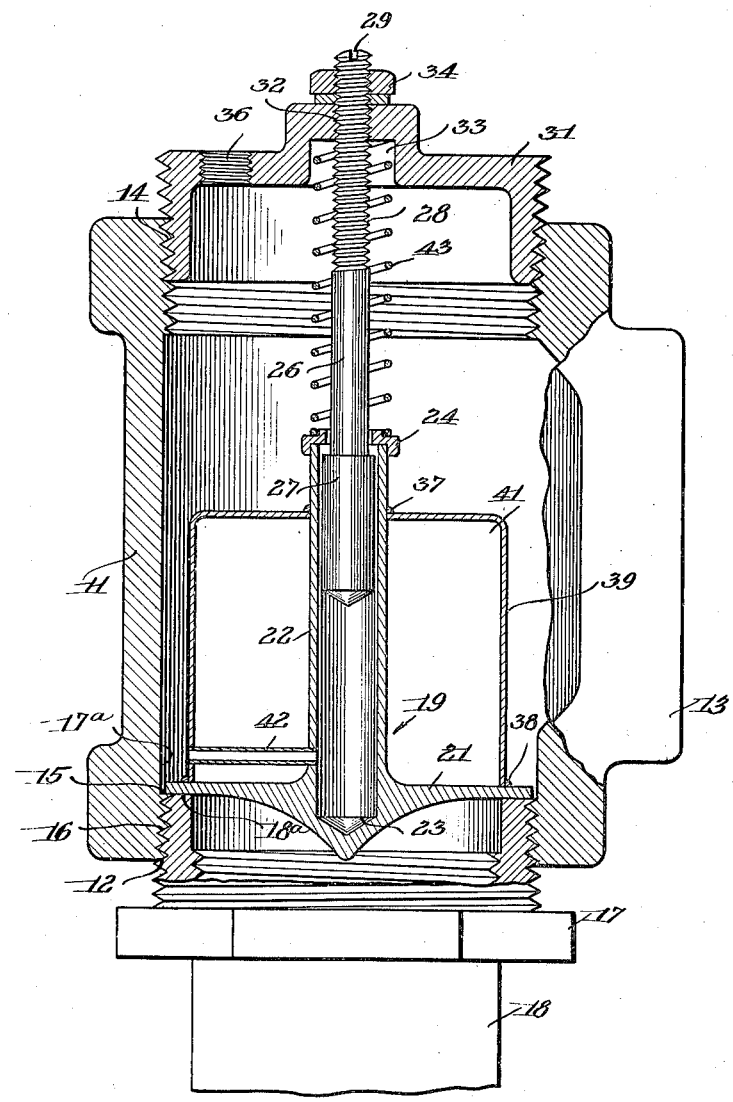
INVENTOR.
Frank M. Harm
BY Cumpston & Shepard
his ATTORNEYS Patented Aug. 27, 1940

2,212,600

UNITED STATES PATENT OFFICE 2,212,600

CHECK VALVE

Frank M. Harm, Rochester, N. Y.

Application December 31, 1938, Serial No. 248,765

3 Claims. (Cl. 251—128)

My invention relates to check valves.

An object of my invention is to provide a check valve of simple construction which may be produced at a minimum cost.

Another object of my invention is to provide a check valve in which the valve body is a standard T-fitting.

A further object of my invention is to provide a check valve wherein a standard T-fitting forms the valve body and wherein the valve is provided with a float chamber to aid in actuating the valve in certain positions thereof.

My invention further contemplates a check valve, operable in a horizontal, vertical, or any other desired position.

Other objects and advantages of my invention will be pointed out in the claims at the end of the specification and will be apparent from the following description, when taken in connection with the accompanying drawing, in which:

The single figure is a side elevation, partly in section, showing the parts of my novel check valve.

The check valve of my invention comprises a valve body generally indicated by the numeral 11, having an inlet opening 12, an outlet opening 13, and a third opening 14, preferably in axial alignment with the inlet opening. One of the important features of my invention lies in the fact that the valve body may be a standard T-fitting, in which the valve parts of the valve may be assembled easily and at a minimum of expense. In most check valves with which I am familiar the valve body is a relatively expensive special casting whereas an ordinary T-fitting, forming the valve body of my invention, is relatively inexpensive. The inlet opening 12 is threaded, as indicated at 16, as is usual in a conventional T-fitting and is adapted to receive a threaded bushing or fitting 17. An inlet pipe 18 is preferably threaded into the bushing or fitting 17. The inner threaded wall of a valve body is machined, as indicated at 17a, to provide a shoulder 15 constituting part of a valve seat 18a. The remainder of the valve seat is formed by the inner annular end of the bushing 17 which is machined to lie in the same plane as the shoulder 15.

The valve, generally indicated by the numeral 19, comprises a substantially flat valve disc 21, with which is preferably formed integral a pilot tube or cylinder 22, extending substantially normal to the plane of the disc. The valve disc is generally circular and is adapted to seat upon the valve seat 18. The lower end of the cylinder 22 is closed by the valve disc as shown at 23 while the upper end is open, and is substantially closed by a cap or collar 24.

Extending into the cylinder 22 is the end portion of an adjustable pilot rod or valve guide rod 26. Preferably the portion of the valve guide which extends into the cylinder 22 is enlarged, as shown in the drawing, to provide a piston 27, which loosely fits in the cylinder 22 and extends loosely through an aperture formed in the cap 24. The upper end of the valve guide rod is threaded, as shown at 28, and provided with a screw driver receiving slot 29.

The third opening 14, which is in axial alignment with the inlet opening 12, is threaded to receive a pipe plug 31, which closes the opening. The plug is substantially centrally tapped, as indicated at 32, to receive the valve guide rod and has a counterbore 33 for a purpose later to be described. A lock nut and washer assembly 34 serves to hold the valve guide rod in any desired adjusted position. The pipe plug 31 at 36 is tapped to receive a vent pipe (not shown) for the purpose of permitting the escape of any air trapped in the valve body.

Secured to the cylinder 22, as shown at 37, and to the valve disc, as shown at 38, is a substantially cup-shaped inverted member 39, which encloses a float chamber 41. The float chamber is sealed against leakage of fluid from the valve chamber into the float chamber, or from the cylinder into the float chamber, as indicated at 37 and 38. Extending between the cylinder 22 and the valve chamber and passing through the float chamber is a tube 42, which, together with the cylinder and the valve guide rod, forms a hydraulic cushion or dash pot for eliminating chattering of the valve, as will be presently described. Encircling the valve guide rod and seated in the counterbore 33 and on the cap 24 is a compression spring 43, which serves to retain the valve in a closed position.

While the check valve of my invention is of general application and may be employed in any fluid system requiring a valve which permits only unidirectional flow of fluid, it is particularly adapted for the cold water return line of a boiler system. With the valve in the position shown in the drawing, the float chamber 41 acts to counteract the weight of the valve disc 21, the cylinder 22 and the action of the spring 43. However, when the valve is used in this position, the float chamber 41 and the spring 43 may be dispensed with in some installations, as the valve is sufficiently heavy so that it will seat by gravity. When, however, the valve is mounted in an inverted position, which is sometimes useful in connecting the cold water return pipe with the top of a boiler in order to obtain the most efficient heat transfer arrangement with the cold water striking the hottest portions at the top of the boiler, the float chamber is extremely advantageous for closing the valve against the action of gravity. With the valve in the inverted position the spring 43 may be eliminated, if desired, since the float chamber is sufficiently buoyant to close the valve against the action of gravity.

The check valve of my invention may be also mounted in any other position besides its vertical and up-side-down position, should other positions of the valve be desired. For example, the valve may be mounted on its side. When the valve is mounted on its side, the float chamber 41 counterbalances the weight of the valve and tends to maintain it substantially in axial alignment with the valve guide rod. In this position of the valve the spring 43 closes the valve when no pressure exists in the inlet pipe 18. When pressure exists in the inlet pipe, as, for example, when fluid is pumped through the system, the valve disc is raised from its seat against the action of the spring 43.

During the opening movement of the valve the cylinder 22 moves with respect to the valve guide rod so that liquid in the cylinder flows out through the tube 42, thereby delaying the action of the valve during the opening movement and eliminating chattering of the valve. During the closing movement of the valve, the cylinder moves downward with respect to the valve guide rod creating a slightly sub-atmospheric pressure in the cylinder, thus delaying the closing of the valve while water is drawn in through the tube 42. The valve thus seats with a minimum of chattering and noise.

In case of failure of the pump, or when it is desired to rely on thermal circulation, the lock nut 34 may be loosened and the valve guide rod threaded upward (as viewed in the drawing), to thereby cause the valve guide rod to lift the valve off its seat and retain the valve in open position to permit the free thermal circulation of liquid through the valve.

While I have described the preferred form of my invention and the way in which the valve is preferably assembled when used in various positions, it will be apparent that various changes and modifications may be made therein, particularly in the form and relation of parts, without departing from the spirit of my invention as set forth in the appended claims.

I claim:

1. A valve structure comprising a conventional T fitting having the usual axially aligned openings and an opening perpendicular to the axially aligned openings serving as an outlet for the valve, a bushing threaded in one of said axially aligned openings adapted to receive an inlet pipe, a plug threaded in the other of said axially aligned openings, a valve guide rod threaded in said plug and extending into the T fitting, a valve adapted to seat on said bushing and having a hollow cylinder formed integral therewith, said guide rod extending into said cylinder and said cylinder having an outlet opening into the T fitting enabling the cylinder and rod to act as a dash pot, and a float carried by said valve.

2. A valve structure comprising a conventional T fitting having the usual axially aligned openings and an opening perpendicular to the axially aligned openings serving as an outlet for the valve, a bushing threaded in one of said axially aligned openings adapted to receive an inlet pipe, a plug threaded in the other of said axially aligned openings, a valve guide rod threaded in said plug and extending into the T fitting, a valve adapted to seat on said bushing and having a hollow cylinder formed integral therewith, said guide rod extending into said cylinder and said cylinder having an outlet opening into the T fitting enabling the cylinder and rod to act as a dash pot, a spring surrounding said valve rod normally adapted to close the valve, and a float carried by said valve.

3. A valve structure comprising a conventional T fitting having the usual axially aligned openings and an opening perpendicular to the axially aligned openings, a bushing threaded into one of said axially aligned openings adapted to receive an inlet pipe, a plug threaded into the other of said axially aligned openings, a valve guide rod threaded in and extending through said plug, a valve adapted to seat on said bushing and having a hollow cylinder secured thereto, said guide rod extending into said cylinder and said cylinder having an outlet opening into the T fitting enabling the cylinder and rod to act as a dash pot, said axially aligned openings being substantially of the same diameter whereby the valve, cylinder, and guide rod may be removed as a unit from the fitting and with the plug, and means on the external end of said plug for enabling adjustment of the valve guide rod in the cylinder without removing the plug, a spring normally urging the valve to a closed position and a float carried by said valve.

FRANK M. HARM.